${\bf 3,265,704}$
PICOLINE ESTERS
Jean Heusser, Zurich, Switzerland, assignor to Hommel Aktiengesellschaft, Adliswil, Zurich, Switzerland
No Drawing. Filed Jan. 29, 1963, Ser. No. 254,580
Claims priority, application Switzerland, Jan. 30, 1962, 1,104/62
6 Claims. (Cl. 260—294.8)

The present invention relates to new picoline esters—specifically $\omega$-hydroxy-$\gamma$-picoline esters—and to the preparation thereof. More especially, the invention relates to esters with araliphatic aromatic acids and with acids with heterocyclic rings, which acids are esterified with the basic alcohol.

The said esters are prepared according to the invention by reacting $\omega$-hydroxy-$\gamma$-picoline with a compound which yields an acid radical, e.g. an acid chloride, acid anhydride, or ester, or by reacting $\omega$-monohalogeno-$\gamma$-picoline with a salt of an aforementioned acid. In this connection, use may be made of a conventional condensing agent.

The so-obtained basic esters are mostly more or less viscous liquids and form salts with a wide variety of inorganic and organic salts, which can be prepared in per se conventional manner by admixing aliquot portions of basic ester and acid in a suitable reaction solvent medium.

The basic esters of the invention are in general difficultly soluble in water. Most salts of the esters have good solubility in water.

The new esters of the invention and their salts, in sharp contrast to the $\omega$-hydroxy-$\beta$-picoline esters and also in sharp contrast to the corresponding alcohols, have no peripheral vasodilator action.

The new esters have an outstanding anti-histaminic action as well as a blood pressure reducing action. Their toxicity is very slight, so that their therapeutic index is high; moreover, they are free of undesired side effects. They are useful whenever anti-histaminic plus blood pressure reducing action is indicated.

The effectiveness of the new esters is determined not only by the alcohol component but also by the acid component. Thus, for example, the aforementioned phenylbutyric acid ester of the $\omega$-hydroxy-$\gamma$-picoline also has a corticotropic-like action.

The esters of the invention can be administered in aqueous dispersion or in aqueous solution, orally or parenterally.

The following animal test data were carried out with $\alpha$-phenylbutyric acid-$\omega$-hydroxy-$\gamma$-picoline ester, as a typical compound of the invention.

*Toxicity.*—The toxicity can be designated as very slight. 0.5 gram per kilogram perorally (in the mouse) is tolerated for 20 days with no side effects whatever. The $DL_{50}$ is about 2 grams per kilogram. In the rat, 2.5 grams per kilogram perorally or 5 grams per kilogram subcutaneously are well tolerated.

*Histamine antagonism.*—The test substance was tested in the large intestine of the guinea pig. Spasm was induced by histamine ($1:10^{-5}$); 0.1 milliliter of 1% aqueous solution of the test substance immediately and completely eliminates the spasm. Similarly, acetylcholine spasm in the large intestine of the rat ($1:10^{-6}$ acetylcholine) was eliminated by 0.1 milliliter of 1% aqueous solution of the test substance. A correponding action was also observed in the case of barium chloride spasm in the large intestine of the rat.

Of particular interest are the positive results obtained with the new esters of this invention against the Schwartzman phenomenon and against anaphylactic shock. The new compounds of the invention are thus useful and effective against whooping cough (pertussis) and measles. Especially useful in this regard are those esters of the present invention which, like the $\alpha$-phenylbutyric acid ester, have a corticotropic-like action.

The following examples set forth presently preferred illustrative modes of preparing new esters according to the invention. In these examples, parts are by weight unless otherwise indicated. The relationship between parts by weight and parts by volume is the same as that between grams and milliliters.

*Example 1*

100 parts of $\omega$-hydroxy-$\gamma$-picoline are suspended in 350 parts by volume of toluene. To the resultant suspension, there is added dropwise a solution of 167 parts of $\alpha$-phenylbutyric acid chloride in 350 parts by volume of toluene. The mixture is then heated for 10 hours on the water-bath, and is then boiled under reflux for 7 hours.

Water is added to the reaction mixture, which is then rendered ammoniacal. The toluene is then separated, the aqueous layer extracted twice with toluene, and the combined toluene extracts washed neutral with water. The toluene solution is treated with charcoal, filtered and dried over sodium sulfate. The filtered toluene solution is evaporated under reduced pressure.

10.2 parts of the residual base are admixed with the corresponding quantity of methanolic hydrochloric acid, the alcohol removed, and the obtained salt recrystallized from acetone. In this way, there is obtained $\alpha$-phenylbutyric acid-$\omega$-hydroxy-$\gamma$-picolyl ester hydrochloride having a melting point of 148° $C_{.k}$.

10.2 parts of the aforesaid base are dissolved in acetone and then admixed with 3.85 parts of methanesulfonic acid. After cooling, there is obtained $\alpha$-phenylbutyric acid-$\omega$-hydroxy-$\gamma$-picolyl ester methanesulfonate having a melting point of 143–144° $C_{.k}$.

*Example 2*

31 parts of $\alpha$-phenylbutyric acid anhydride are boiled under reflux for 8 hours with 11 parts of $\omega$-hydroxy-$\gamma$-picoline in 300 parts by volume of toluene. Further working up follows the procedure set forth in Example 1, the same products being obtained.

*Example 3*

0.020 part of potassium iodide is added to 2.5 parts of $\omega$-monochloro-$\gamma$-picoline and 3.7 parts of sodium $\alpha$-phenylbutyrate in 30 parts by volume of toluene, and the mixture boiled under reflux for 5 hours. The reaction product is treated with charcoal, filtered and the filtrate evaporated under reduced pressure. The residual basic ester is converted into salt form in the manner described in Example 1.

*Example 4*

10.9 parts of $\omega$-hydroxy-$\gamma$-picoline are dissolved in 300 parts by volume of benzene. A solution of 14 parts of benzoyl chloride in 100 parts by volume of absolute benzene is then added dropwise slowly. Considerable rise in temperature takes place, a yellow precipitate being forthwith thrown down. Boiling under reflux is continued for 5 hours. After cooling, 300 parts by volume of water are added and the whole rendered alkaline with ammonia. A white precipitate separates out immediately but goes back into solution upon prolonged shaking. The benzene solution is separated and washed with water until it is neutral. It is then dried with sodium sulfate.

The dried benzene solution is filtered and the benzene distilled off under pressure.

5 parts of the residual basic ester thus obtained are admixed with 52.8 parts by volume of methanolic HCl (16.2 mg. HCl/ml.), the mixture considerably concentrated, and then cooled. Fine needles crystallize out which, after being dried, have a melting point of 199–200° C.$_k$. They are filtered off with suction and washed with ether.

6.2 parts of the basic ester thus obtained are dissolved in 30 parts by volume of acetone, after which 2.89 parts of 96.44% methanesulfonic acid is added and the mixture cooled. A large quantity of cream-colored crystals separate out immediately. The crystals are separated by suction filtration and are washed with ether. They are redissolved in methanol, a small quantity of ether added, and the mixture cooled. Following the ensuing crystallization, the crystals are separated by suction filtration, and washed with ether, the product being methane-sulfonate of benzoic acid-ω-hydroxy-γ-picolyl ester and having a melting point of 150–151° C.$_k$.

Having thus disclosed the invention, what is claimed is:

1. A member selected from the group consisting of α-phenylbutyric acid-ω-hydroxy-γ-picolyl ester, benzoic acid-ω-hydroxy-γ-picolyl ester and the acid salts thereof with pharmaceutically acceptable acids.
2. α-Phenylbutyric acid-ω-hydroxy-γ-picolyl ester.
3. Benzoic acid-ω-hydroxy-γ-picolyl ester.
4. Hydrochloride of α-phenylbutyric acid-ω-hydroxy-γ-picolyl ester.
5. Methanesulfonate of α-phenylbutyric acid-ω-hydroxy-γ-picolyl ester.
6. Methanesulfonate of benzoic acid-ω-hydroxy-γ-picolyl ester.

References Cited by the Examiner

UNITED STATES PATENTS

| | | | |
|---|---|---|---|
| 2,502,868 | 4/1950 | Martin et al. | 260—295.5 |
| 2,502,870 | 4/1950 | Martin et al. | 260—295.5 |
| 2,945,041 | 7/1960 | Seifter et al. | 260—295.5 |
| 3,038,002 | 6/1962 | Reeve | 260—473 |
| 3,069,317 | 12/1962 | Jensen | 167—55 |
| 3,071,588 | 1/1963 | Rorig | 260—295 |
| 3,073,741 | 1/1963 | Vecchi et al. | 167—55 |
| 3,098,857 | 7/1963 | Rorig | 260—295 |
| 3,100,775 | 8/1963 | Rorig | 260—295 |

FOREIGN PATENTS

| | | |
|---|---|---|
| 251,023 | 7/1948 | Switzerland. |
| 251,025 | 7/1948 | Switzerland. |
| 251,026 | 7/1948 | Switzerland. |
| 163,742 | 8/1949 | Austria. |

WALTER A. MODANCE, *Primary Examiner.*

DUVAL T. McCUTCHEN, *Examiner.*

ROBERT T. BOND, *Assistant Examiner.*